(12) United States Patent
Ryu (10) Patent No.: US 7,819,691 B2
(45) Date of Patent: Oct. 26, 2010

(54) ELECTRICAL CONNECTOR THAT REDUCES GENERATION OF STATIC

(75) Inventor: Han-Jin Ryu, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 690 days.

(21) Appl. No.: 11/481,755

(22) Filed: Jul. 5, 2006

(65) Prior Publication Data

US 2007/0019147 A1    Jan. 25, 2007

(30) Foreign Application Priority Data

Jul. 5, 2005    (KR)    ...................... 10-2005-0060042

(51) Int. Cl.
*H01R 12/24* (2006.01)
(52) U.S. Cl. ..................................................... 439/495
(58) Field of Classification Search ................ 439/495, 439/67, 496, 493, 260, 79, 924.1
See application file for complete search history.

(56) References Cited

U.S. PATENT DOCUMENTS

| | | | | | |
|---|---|---|---|---|---|
| 3,989,336 | A | * | 11/1976 | Rizzio et al. | ................. 439/260 |
| 4,718,859 | A | * | 1/1988 | Gardner | ...................... 439/329 |
| 6,851,968 | B2 | * | 2/2005 | Tsunematsu | ................ 439/495 |

* cited by examiner

*Primary Examiner*—Edwin A. Leon
(74) *Attorney, Agent, or Firm*—Innovation Counsel LLP (57) ABSTRACT

An electrical connector that prevents generation of static electricity is presented. The connector includes a body portion having a receiving space and a bottom surface that forms an inner wall of the receiving space. A terminal portion is disposed on the body portion, and a cover portion is positioned to enclose the receiving space when closed. A protecting member is disposed on the cover portion and protrudes beyond the outer surface of the terminal portion. By using this connector, damage to circuit parts or circuit elements caused by static electricity may be prevented.

19 Claims, 6 Drawing Sheets

FIG. 9

ELECTRICAL CONNECTOR THAT REDUCES GENERATION OF STATIC

CROSS-REFERENCE TO RELATED APPLICATION(S)

This application relies for priority upon Korean Patent Application No. 2005-60042 filed on Jul. 5, 2005, the content of which is herein incorporated by reference in its entirety.

BACKGROUND OF THE INVENTION

1. Field of the Invention

The present invention relates to a connector, a liquid crystal display device having the connector and a connecting method using the connector. More particularly, the present invention relates to a connector capable of preventing static electricity, a liquid crystal display device having the connector and a connecting method using the connector.

2. Description of the Related Art

Today, demand for more advanced, small, and light liquid crystal display (LCD) devices is increasing to meet consumer demand for electronics with such characteristics.

LCD devices which have can be made to be small and light while operating at low power consumption, have gradually attracted attention as a technology that is capable of replacing the cathode ray tube (CRT) devices as the mainstream display device. Already, the LCD device has been installed and is being used with many information-processing equipment that require a display device.

An LCD device modulates light to display an image. Particularly, a voltage is applied to liquid crystal molecules to change the alignment of the liquid crystal molecules, and then the changed alignment of the liquid crystal molecules changes the optical properties of a liquid crystal cell, such as birefringence, polarization, dichromatism, diffusiveness, and so on. The LCD device converts the variation of optical properties into visual data to display an image.

The LCD device includes an LCD panel to display an image by using liquid crystal disposed between two substrates, a source printed circuit board (PCB), and a gate PCB. The source PCB and the gate PCB drive the LCD panel. Typically, the source and gate PCBs are connected to the LCD panel through a data tape carrier package (TCP) and a gate TCP, respectively.

Then, the source PCB is connected to an end of a flexible printed circuit (FPC) film, and another end of the FPC film is connected to a control board by inserting the end into a connector mounted on the control board.

A lead portion formed on the end portion of the FPC film is aligned with a connector pin formed on the connector.

However, the connector pin of the connector being exposed is disadvantageous for many reasons. For example, the lead portion of the FPC film makes contact with the exposed connector pin during an assembly process before the lead portion of the FPC film is engaged to the connector pin, or the connector pin makes contact with external conductive material during various processes. Upon contact, static electricity is instantaneously generated. This static electricity might cause damage to circuit parts or circuit elements formed on the control board.

Moreover, external materials contaminate the exposed connector pin.

Therefore, a connector that does not generate static electricity and that is protected from the external environment is necessary.

SUMMARY OF THE INVENTION

The present invention provides a connector having a structure that prevents the generation of static electricity and does not get easily contaminated by environmental elements.

In one aspect, the invention is an electrical connector that includes a body portion, a terminal portion, a cover portion, and a protecting member. The body portion has a receiving space and a bottom surface that forms an inner wall of the receiving space. The terminal portion is disposed on the body portion, and the cover portion is positioned to enclose the receiving space. The protecting member is disposed on the cover portion and protrudes beyond an outer surface of the terminal portion.

In another aspect, the present invention is an LCD device that includes an LCD panel displaying an image, a control PCB, and an FPC film. The control PCB outputs a control signal to control the LCD panel, and has a connector. The connector includes a body portion having a receiving space and a bottom surface that forms an inner wall of the receiving space. The connector also includes a terminal portion disposed on the body portion, a cover portion positioned to enclose the receiving space when closed, and a protecting member disposed on the cover portion. The protecting member protrudes beyond an outer surface of the terminal portion. A first end portion of the FPC film is electrically connected to the LCD panel. A second end portion of the FPC film is couplable to the connector to transmit the control signal output from the control PCB to the LCD panel In yet another aspect, the present invention includes a connecting method using a connector. The method entails forming connector that has a body portion with a receiving space, a terminal portion, a cover portion, and a protecting member disposed on the cover portion. The method further entails inserting a connecting member into the receiving space to electrically connect the terminal portion of the connector to the connecting member.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
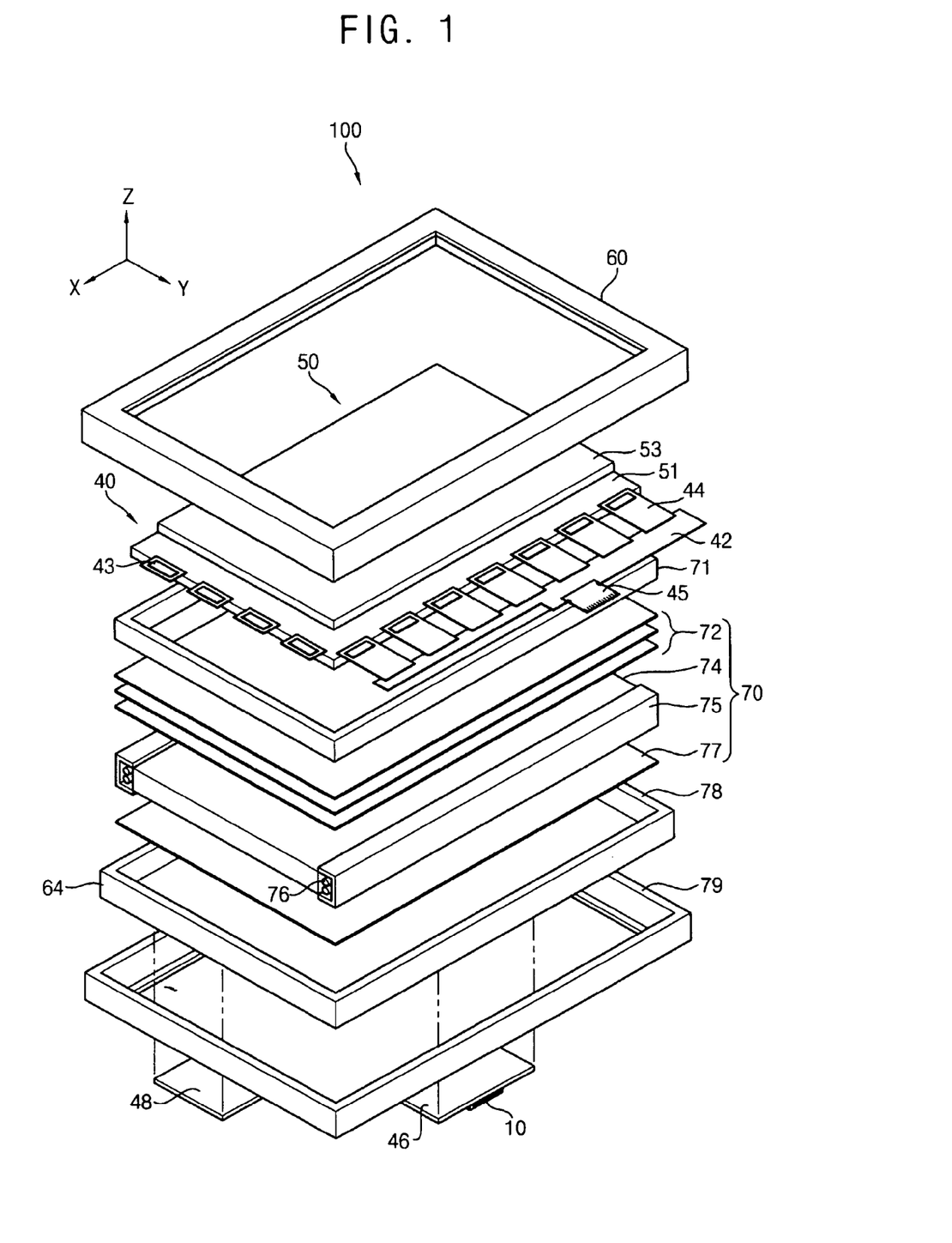
FIG. 1 is an exploded perspective view illustrating a liquid crystal display (LCD) device according to an example embodiment of the present invention.

FIG. 1 is an exploded perspective view illustrating a liquid crystal display (LCD) device 100. FIG. 1 shows a source printed circuit board (PCB) 42 to which a flexible printed circuit (FPC) film 45 is attached. Although an LCD device is shown as the display device in FIG. 1, this is just an exemplary embodiment of the present invention, which may be used with display devices other than an LCD device. For example, display devices such as a plasma display panel (PDP) device and an organic light-emitting diode (OLED) display device that do not include a backlight assembly 70 may be used with the invention.

The structure of the LCD device 100 shown in FIG. 1 is an exemplary embodiment of the present invention, and the present invention is not limited to the structure. The structure of the LCD device may be modified in various ways.

Referring to FIG. 1, the LCD device 100 shown in FIG. 1 includes an LCD panel assembly 40 displaying an image and a backlight assembly 70 providing light to the LCD panel assembly 40. The LCD device 100 may further include a top chassis 60 configured to fasten an LCD panel 50 to the backlight assembly 70. The LCD device 100 optionally includes other components as needed.

The LCD panel assembly 40 includes an LCD panel 50 and tape carrier packages (TCPs) 43 and 44 in addition to the source PCB (PCB) 42 and the FPC film 45. The FPC film 45 is connected to a connector 10 mounted on a control board 46, which is typically a type of PCB. The FPC film 45 transmits a driving signal for driving the LCD panel 50 to the source PCB 42.

The LCD panel 50 includes a thin-film transistor (TFT) substrate 51 having a plurality of TFTs, a color filter substrate 53 disposed over the TFT substrate 51, and a liquid crystal layer (not shown) disposed between the TFT substrate 51 and the color filter substrate 53. The TFT substrate 51 includes a transparent glass substrate on which a plurality of TFTs (not shown) are arranged in a matrix formation. A data line is electrically connected to a source terminal of each of the TFTs formed on the TFT substrate 51, and a gate line is electrically connected to a gate terminal of each of the TFTs formed on the TFT substrate 51. The source terminal of each of the TFTs formed on the TFT substrate 51 is connected to the control board 46 through the PCB 42 and the FPC film 45. A pixel electrode including a transparent conductive material, such as indium tin oxide (ITO), is electrically connected to a drain terminal of each of the TFTs formed on the TFT substrate 51.

When electric signals are applied to the data line and the gate line of the LCD panel 50 from the source PCB 42, the source terminal and the gate terminal of the TFT receive the electric signals. The TFT turns on or turns off in accordance with the electric signals applied to the gate line, and the electric signals applied to the data line is output to a pixel through the drain terminal.

The color filter substrate 53 is disposed over the TFT substrate 51 such that it is in a plane that is substantially parallel to the TFT substrate 51. A plurality of red-green-blue (RGB) pixels are formed on the color filter substrate 53, usually by a thin-film process. When light is incident onto the RGB pixels, certain wavelengths are filtered so that light of a predetermined color exits the RGB pixels. A common electrode made of a transparent conductive material such as ITO is typically formed on the entire surface of the color filter substrate 53. When a power source is applied to the source and gate terminals of the TFT to turn on the TFT, an electric field is generated between the pixel electrode and the common electrode of the color filter substrate 53.

The electric field affects an alignment angle of liquid crystal molecules between the TFT substrate 51 and the color filter substrate 53, and the optical transmittance varies according to the alignment angle. Accordingly, a desired level of light transmittance through each pixel is obtained by controlling the electric field between the pixel and the common electrode.

In some alternative embodiments, the common electrode is formed on the TFT substrate 51. In this case, when power is applied to the source and the gate terminal of the TFT to turn on the TFT, an electric field is generated between the pixel electrode and the common electrode formed on the TFT substrate 51.

In order to control the alignment angle and the alignment timing of liquid crystal molecules in the LCD panel 50, a driving signal and a timing signal are applied to the gate line and the data line of the TFT. A gate TCP 43 applying a gate driving signal and a data TCP 44 applying a data driving signal are disposed on a gate side portion and a data side portion of the LCD panel 50, respectively. The gate TCP 43 is electrically connected to the PCB 42 through signal lines formed on the TFT substrate 51.

In some embodiments, the gate TCP 43 is omitted and a gate driving circuit is formed directly on the TFT substrate 51 using TFTs.

The source PCB 42 receives a driving signal from a component outside of the LCD panel 50 and transmits the driving signal to the data line and the gate line. The source PCB 42 is connected to the data TCP 44.

The control board 46 is connected to the source PCB 42 through the FPC film 45. The control board 46 generates a data signal and a gate driving signal to drive the LCD panel 50 and timing signals to control the timing for applying the data signal and the gate driving signal. The data signal, the gate driving signal, and the timing signals are applied to the gate line and the data line of the LCD panel 50 through the source PCB 42.

The backlight assembly 70 is disposed under the LCD panel assembly 40 to provide the LCD panel 50 with uniform light. The LCD device may further include an upper mold frame 71 disposed over the backlight assembly 70 and a bottom mold frame 79 disposed under the backlight assembly 70. The backlight assembly 70 is supported by the upper and lower mold frames 71 and 79. A light source 76 is received in a bottom chassis 78.

The backlight assembly 70 includes the light source 76 providing light, a light-guide plate 74 guiding the light emitted from the light source 76 to the LCD panel 50, a reflective sheet 77 disposed under the light-guide plate 74 to reflect the light emitted from the light source, a light source cover 75 covering and protecting the light source 76 and having a reflective material coated on an inner surface to reflect the light emitted from the light source 76, and an optical sheet 72 improving the luminance characteristics of the light emitted from the light source 76 and providing the LCD panel 50 with the light.

Although FIG. 1 shows a lamp as the light source 76, the lamp is an exemplary embodiment of the present invention, and the present invention is not limited to the lamp. For example, a light-emitting diode (LED), a linear light source, or a planar light source may serve as the light source 76 in other embodiments.

An inverter 48 is disposed on a rear surface of the bottom chassis 78. The "rear" surface, as used herein, refers to the surface facing the bottom of FIG. 1. The inverter 48 transforms power received from an external source to a predetermined voltage level, and supplies the light source 76 with power to drive the light source 76. The power is applied to the light source 76 through a socket 73 (refer to FIG. 2) and a wire 761 (refer to FIG. 2), both of which are connected to the light source 76.

Figure 2:
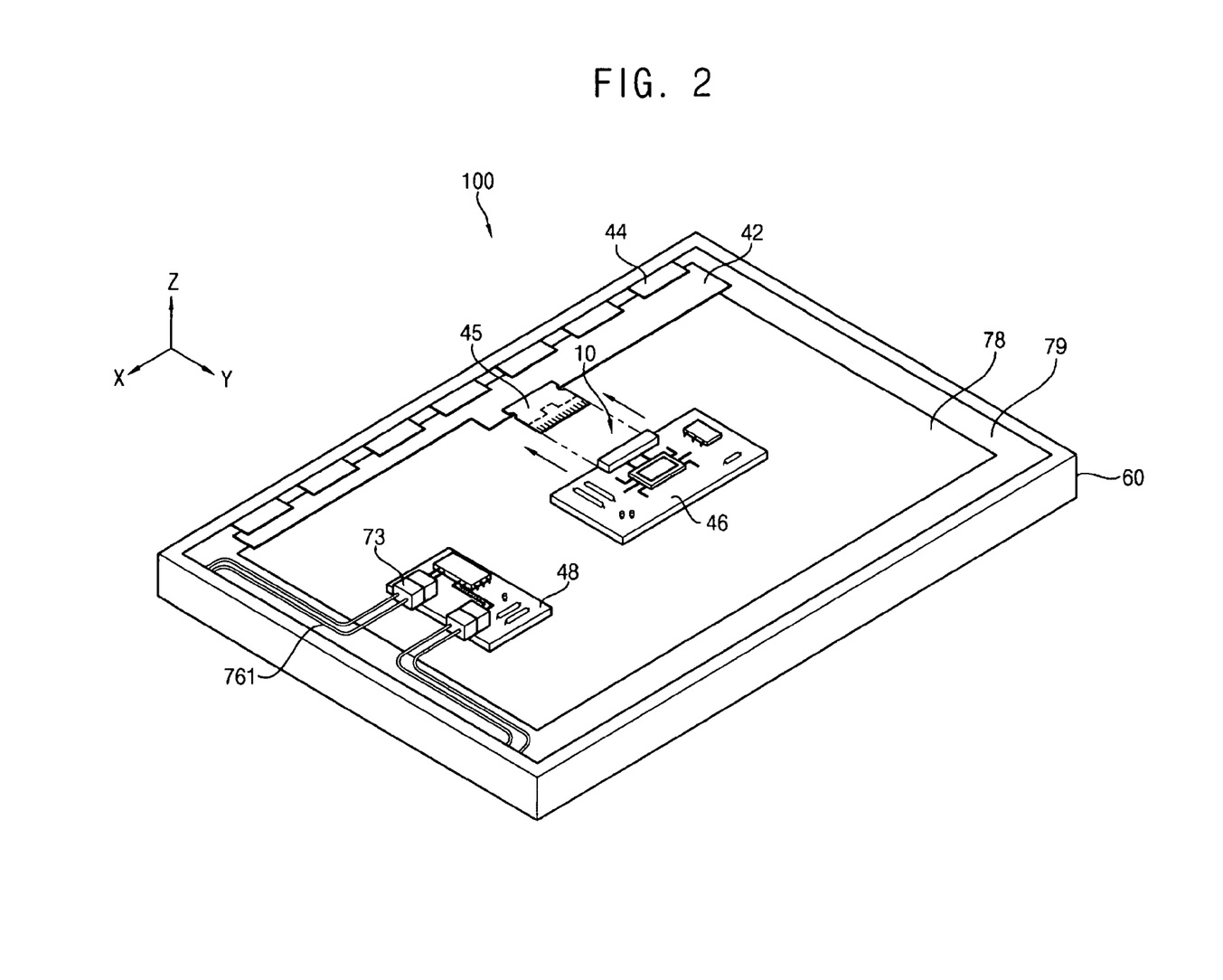
FIG. 2 is a rear perspective view illustrating the LCD device in FIG. 1.

The data TCP 44 and the source PCB 42 fold over a side of the upper mold frame 71 to be coupled to the rear surface of the bottom chassis 78 in the manner shown in FIG. 2. The LCD panel assembly 40 having the data TCP 44 and the source PCB 42 is partially covered by the top chassis 60, and is disposed over the backlight assembly 70. Although not illustrated in FIG. 1, a front case disposed over the top chassis and a rear case disposed under the bottom mold frame 79 are combined with each other to complete the assembly of the LCD device 100.

The FPC film 45 shown in FIG. 1 is inserted into and secured to the connector 10 mounted on the control board 46. Accordingly, a driving signal from the control board 46 is transmitted to the LCD panel 50.

Hereinafter, the structure of the connector 10 mounted on the control board 46 and the FPC film 45 will be described in detail with reference to accompanying FIGS. 2 to 6.

Figure 3:
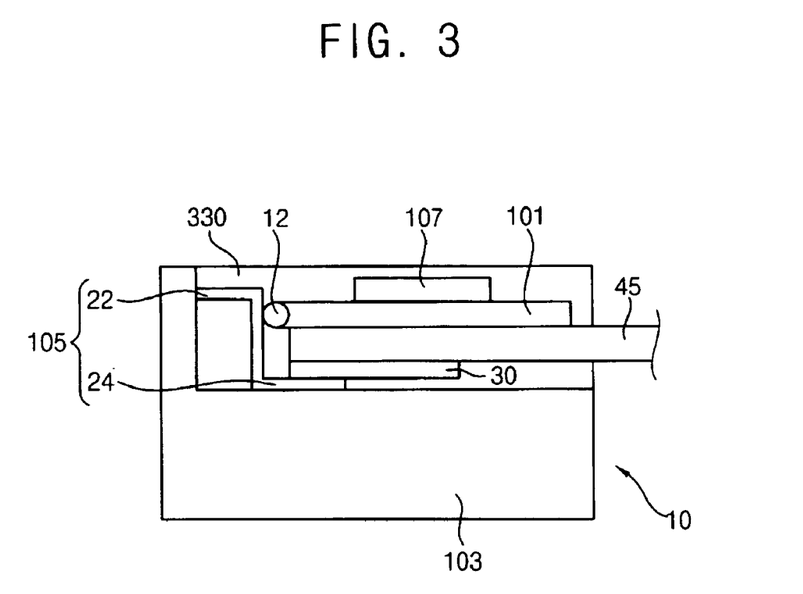
FIG. 3 is a cross-sectional view illustrating a connector shown in FIG. 2 with which a flexible printed circuit (FPC) film is combined.

FIG. 2 is a rear perspective view illustrating the LCD device 100 shown in FIG. 1. FIG. 2 illustrates the elements of the LCD device 100 that are shown in FIG. 1 after they are assembled. As "rear" is defined in reference to the orientation of the device as shown in FIG. 1, FIG. 2 shows the LCD device 100 rotated 180 degrees with respect to an X-axis shown in FIG. 1. FIG. 3 is a cross-sectional view illustrating a connector shown in FIG. 2 with which an FPC film is combined. Although the connector 10 is mounted on the control board 46 in FIG. 2, this is just an exemplary embodiment of the present invention, and the present invention is not limited to this configuration. The present invention may be applied to another PCB of the LCD device 100.

The control board 46 may be moved along the Y-axis as indicated by the arrows in FIG. 2. When the control board 46 is moved this way, the FPC film 45 may be inserted into and secured to the connector 10 of the control board 46. The connector 10 mounted on the control board 46 may have a rectangular box shape with the longest dimension extending along the X-axis. The connector 10 includes a cover portion 101 and a body portion 103 that is combined with the cover portion 101 through an axis 12. The axis 12 acts as a hinge that allows the cover portion 101 to open and close.

Referring to FIG. 3, the FPC film 45 is inserted into a space over the body portion 103 of the connector 10, and then is covered with the cover portion 101 to be secured.

The body portion 103 of the connector 10 secures the FPC film 45 when the FPC film 45 is inserted into the connector 10. The cover portion 101, which is combined with the body portion 103 through the axis 12, covers and secures the FPC film 45 with the body portion 103.

As shown in FIG. 2, the axis 12 that allows the cover portion 101 to fold up with respect to the body portion 103 may extend in the X-axis direction that is substantially perpendicular to the Y-axis. As mentioned above, the FPC film 45 is inserted into the connector 10 along the Y-axis. Thus, the cover portion 101 rotates with respect to the axis 12, i.e., the X-axis.

The cover portion 101 is opened, and the FPC film 45 is inserted into the space over the body portion 103 of the connector 10. Then, the cover portion is closed to secure the FPC film.

Hereinafter, the connector 10 disposed on the control board 46 to connect the FPC film 45 to the control board 46 will be described in detail.

Figure 4:
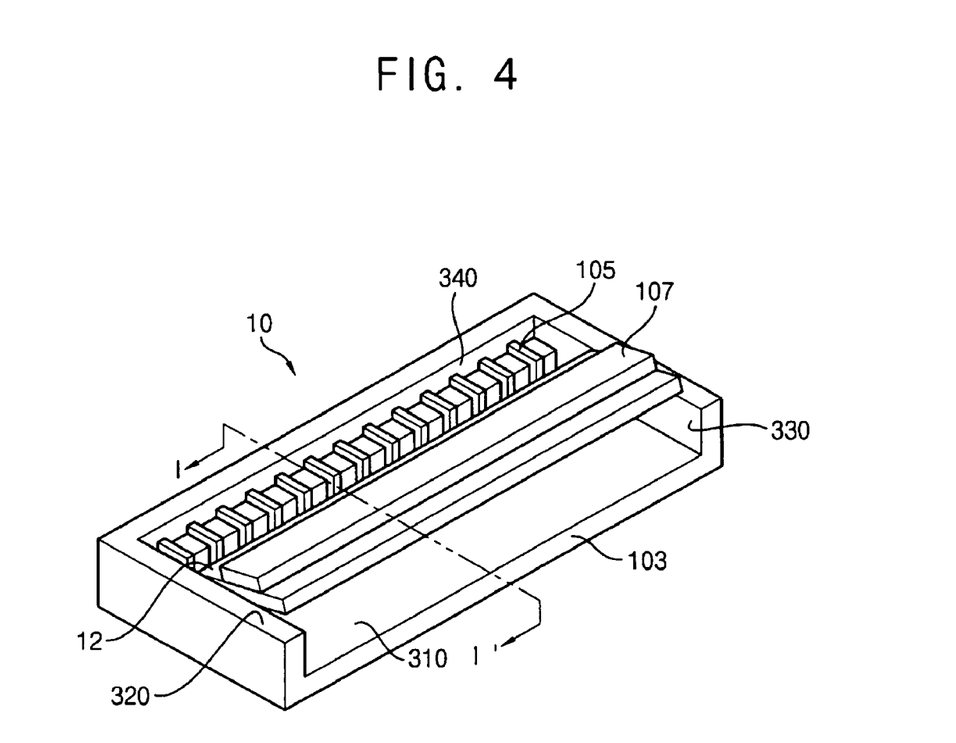
FIG. 4 is a perspective view illustrating a connector according to a first embodiment of the present invention shown in FIG. 1.
Figure 5:
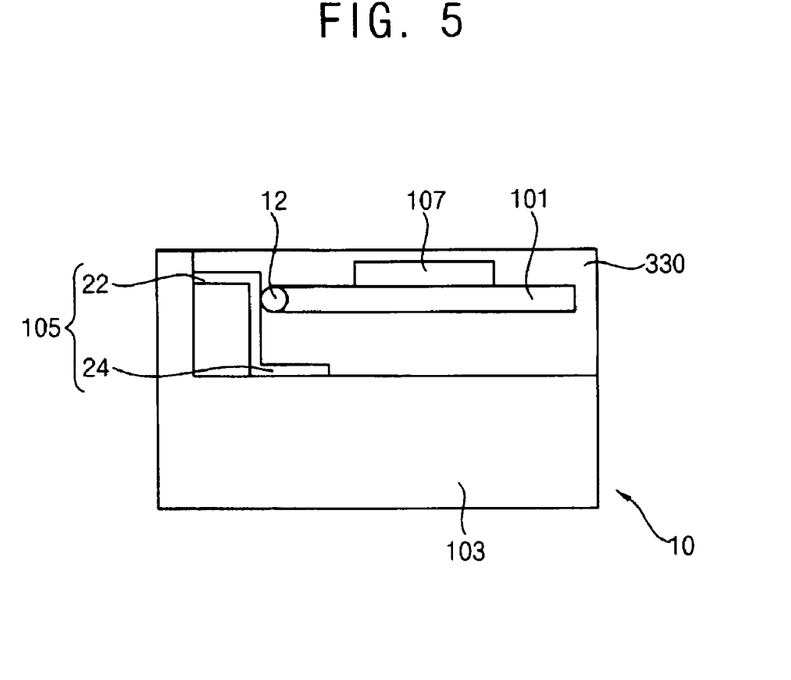
FIG. 5 is a cross-sectional view taken along the line I-I' in FIG. 4.
Figure 6:
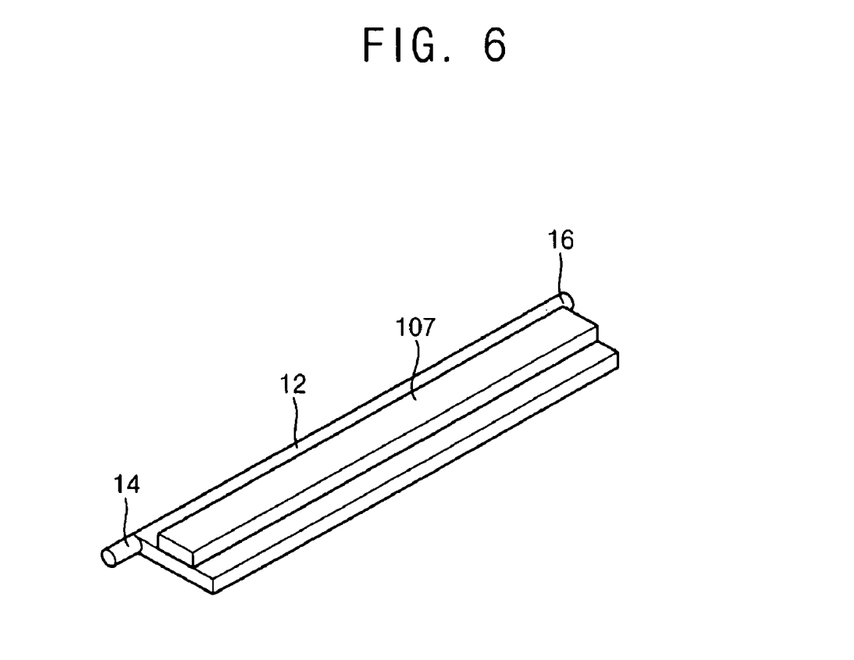
FIG. 6 is a perspective view illustrating a cover portion of the connector shown in FIG. 4.

FIG. 4 is a perspective view illustrating a connector according to a first embodiment of the present invention, FIG. 5 is a cross-sectional view taken along the line I-I' in FIG. 4, and FIG. 6 is a perspective view illustrating the cover portion of the connector shown in FIG. 4.

Referring to FIGS. 4, 5, and 6, the connector 10 according to the first embodiment of the present invention includes a body portion 103, a terminal portion 105, and a cover portion 101.

The body portion 103 has an opening to receive the FPC film 45 and includes a bottom surface 310, and first to third sidewalls 320, 330 and 340 extending from the bottom surface 310. As there is no top surface that is substantially parallel to the bottom surface 310, the connector 10 has an open structure. The bottom surface 310 and the first to third sidewalls 320, 330 and 340 define a receiving space to receive the FPC film 45. When the FPC film 45 is inserted into the receiving space over the body portion 103, it makes contact with the bottom surface 310 and the first to third sidewalls 320, 330 and 340.

The terminal portion 105, which includes a plurality of conductive terminals that correspond to a plurality of lead lines 30 formed on the FPC film 45, is disposed on the body portion 103. The terminal portion 105 is secured to the bottom surface 310 and the third sidewall 340 of the body portion 103, as shown in FIG. 3, and is connected to a plurality of signal lines (not shown) formed on the control board 46. Thus, the terminal portion 105 electrically connects the signal lines of the control board 46 to the lead lines 30 of the FPC film 45.

The cover portion 101 is combined with the body portion 103. Particularly, the cover portion 101 may be a plate that is sized to cover a portion of the bottom surface 310 of body portion 103. For example, the cover portion 101 a rectangular shape with long sides and short sides.

The axis 12 is extends along the long side of the cover portion 101. The axis 12 includes extensions 14 and 16 (shown in FIG. 6). The extensions 14, 16 extend beyond the length of the cover portion 101 from the ends of the axis 12 by a predetermined length. The extensions 14, 16 function to combine the cover portion 101 with the body portion 103.

Particularly, the protruding portions 14 and 16 extend beyond the length of the axis 12 by a predetermined length to make contact with the first and second sidewalls 320 and 330 of the body portion 103. The protruding portions 14 and 16 are coupled to recessed portions (not shown) recessed from the body portion 103 by a predetermined depth. Thus, the cover portion 101 is combined with the body portion 103 by coupling the protruding portions 14 and 16 to the recessed portions. The protruding portions 14, 16 are coupled with the recessed portions to allow the cover portion 101 to rotates with respect to the axis 12.

The connector 10 includes a protecting member 107 disposed on an upper surface of the cover portion 101.

The terminal portion 105 includes a first terminal portion 22 and a second terminal portion 24. The first terminal portion 22 is positioned farther away from the bottom surface 310 than the second terminal portion 24. In the embodiments of FIG. 3 and FIG. 5, the second terminal portion 24 is adjacent to the body portion 103.

In the embodiment of FIG. 5, the protecting member 107 has a surface that is further away from the bottom surface 310 than any surface of the first terminal portion 22. Each of the first, second, and third sidewalls 320, 330, 340 has a surface that is further away from the bottom surface 310 than any surface of the protecting member 107.

During the assembly process, the first terminal portion 22 could make contact with the lead line 30 of the FPC film 45 or one of other external conductive materials before the connector 10 is combined with the FPC film 45, especially given that the first terminal portion 22 is formed farther away from the bottom surface 310 than the cover portion 101. This contact instantaneously generates static electricity. To prevent this premature contact between the first terminal portion 22 and either the lead line or another conductive material, the protecting member 107 is formed even farther away from the bottom surface 310. This way, the protecting member 107 stops any component from contacting the terminal portion 105 from the top of FIG. 3, making it unlikely that the terminal portion 105 will make electrical contact with another component before the FPC film 45 is inserted.

The protecting member 107 not only prevents static electricity from being generated but also prevents the first terminal portion 22 from being contaminated by unintended contact with other components.

The length of the protecting member 107 is substantially the same as that of the length of the cover portion 101. In one embodiment, the protecting member 107 includes substantially the same material(s) as those of the cover portion 101, and may contain an insulating material to further prevent the generation of static electricity.

The protecting member 107 may be integrally formed with the cover portion 101 in some embodiments.

Figure 7:
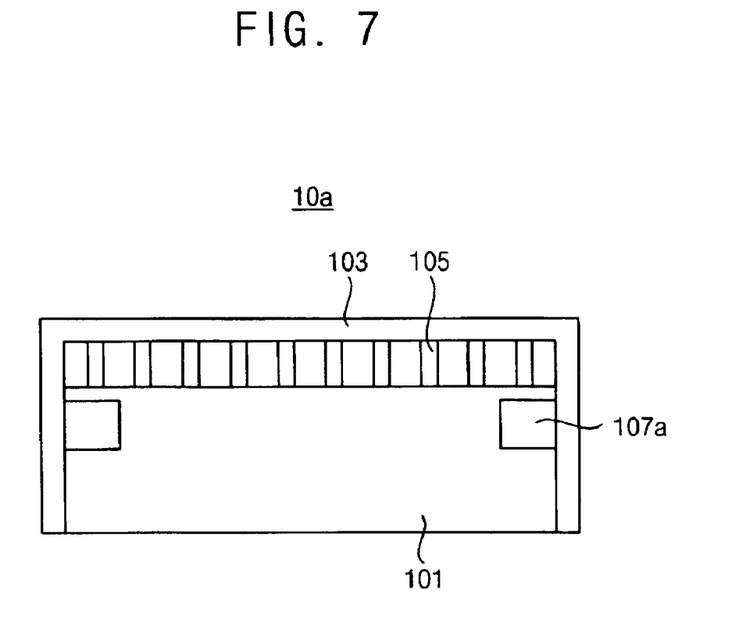
FIG. 7 is a plan view illustrating a connector according to a second embodiment of the present invention.

FIG. 7 is a plan view illustrating a connector according to a second embodiment of the present invention.

The connector of the second embodiment is substantially the same as the connector according to the first embodiment, with a main difference being the layout of the protecting member. Thus, any redundant description will be omitted, and substantially the same elements will be represented by the same reference numerals and the same names.

Referring to FIG. 7, a connector 10a according to a second embodiment of the present invention includes a body portion 103, a terminal portion 105, and a cover portion 101.

The connector 10a includes protecting members 107a disposed on the surface of the cover portion 101 that would be positioned farthest away from the surface of the body portion 103 when assembled.

Particularly, the protecting members 107a are smaller than the cover portion 101 and partially overlap the cover portion 101. For example, the protecting members 107a may be disposed on two ends of the length of the cover portion 101 and contain substantially the same material as the cover portion 101. The protecting members 107a may be integrally formed with the cover portion 101 in some embodiments.

Figure 8:
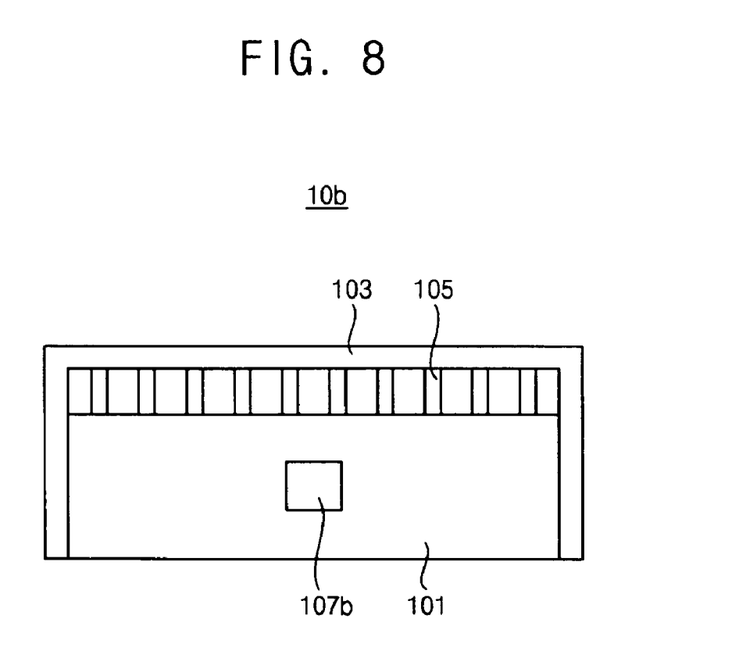
FIG. 8 is a plan view illustrating a connector according to a third embodiment of the present invention.

FIG. 8 is a plan view illustrating a connector according to a third embodiment of the present invention.

The connector according to the present embodiment is substantially the same as the connector according to the first and second embodiments except for the layout of the protecting member. Thus, any redundant description will be omitted, and substantially the same elements will be represented by the same reference numerals and the same names.

Referring to FIG. 8, a connector 10b according to a third embodiment of the present invention includes a body portion 103, a terminal portion 105 and a cover portion 101.

The connector 10b includes a protecting member 107b disposed on the surface of the cover portion 101 that would be positioned farthest away from the surface of the body portion 103 when assembled. Particularly, the protecting member 107b is smaller than the cover portion 101 and partially overlap the cover portion 101 near the central portion of the cover portion 101. The protecting member 107b may have various shapes such as a square, a rectangle, a circle, a diamond, and so on. The protecting member 107b includes substantially the same material as that of the cover portion 101. The protecting member 107b may be integrally formed with the cover portion 101.

Figure 9:
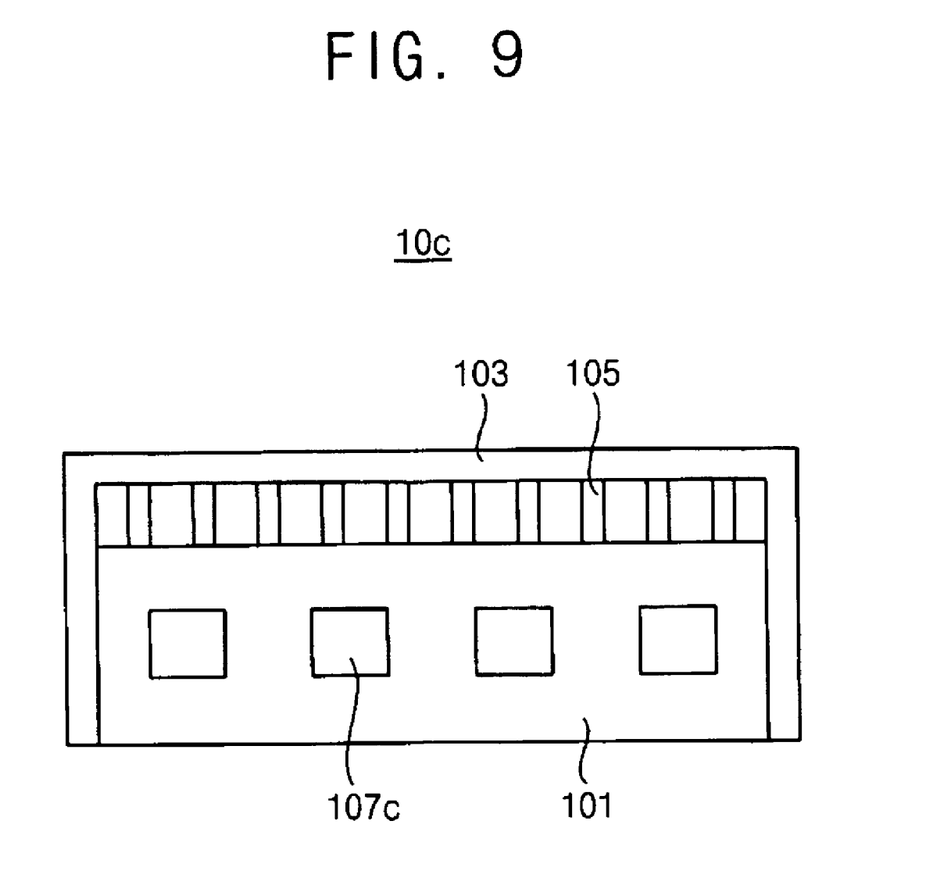
FIG. 9 is a plan view illustrating a connector according to a fourth embodiment of the present invention.

FIG. 9 is a plan view illustrating a connector according to a fourth embodiment of the present invention.

The connector according to the present embodiment is substantially the same as the connector according to the first to third embodiments except for the layout of the protecting member. Thus, any redundant description will be omitted, and substantially the same elements will be represented by the same reference numerals and the same names.

Referring to FIG. 9, a connector 10c according to a fourth example embodiment of the present invention includes a body portion 103, a terminal portion 105 and a cover portion 101.

The connector 10c includes protecting members 107c disposed on the surface of the cover portion 101 that would be positioned farthest away from the surface of the body portion 103 when assembled.

Particularly, the protecting members 107c are smaller than the cover portion 101 so as to partially overlap with the cover portion 101, and a plurality of the protecting members 107c are arranged substantially along the length of the cover portion 101. For example, the protecting members 107c are arranged along a long side of the cover portion 101. The protecting members 107c contain substantially the same material as that of the cover portion 101. The protecting members 107 may be integrally formed with the cover portion 101 in some embodiments.

As described above, the connector according to the present invention includes a protecting member disposed on the cover portion such that a component would contact the protecting member before it contacts the terminal portion. Thus, the protecting member prevents generation of static electricity by unintended contact between the terminal portion and another component and protects the terminal portion from contamination. With the protecting member, any damage to circuit parts or circuit elements caused by static electricity may be prevented.

Because the protecting member may include substantially the same material as that of the cover portion, or may be integrally formed with the cover portion, additional process is unnecessary and manufacturing costs may be reduced.

Having described the example embodiments of the present invention and its advantages, it is noted that various changes, substitutions and alterations may be made herein without departing from the spirit and scope of the invention as defined by appended claims.

What is claimed is:

1. An electrical connector comprising:
    a body portion having a receiving space and a bottom surface that forms an inner wall of the receiving space;
    a terminal portion disposed on the body portion;
    a cover portion positioned to enclose the receiving space when closed; and
    a protecting member disposed on the cover portion and protruding beyond an outer surface of the terminal portion,
    wherein at least a portion of the terminal portion is uncovered by the cover portion,
    the protecting member extends along a longitudinal direction of the cover portion, and
    the protecting member is spaced apart from the uncovered portion of the terminal portion in a direction perpendicular to the longitudinal direction of the cover portion.

2. The connector of claim 1, wherein the protecting member has a quadrilateral plane shape.

3. The connector of claim 1, wherein the protecting member comprises a plurality of protecting members arranged along the length of the cover portion.

4. The connector of claim 1, wherein the protecting member comprises substantially the same material as the cover portion.

5. The connector of claim 4, wherein the protecting member is integrally formed with the cover portion.

6. The connector of claim 1, wherein the terminal portion comprises a first terminal portion and a second terminal portion, and the first terminal portion is farther away from the bottom surface than the second terminal portion.

7. The connector of claim 6, wherein a connecting member is inserted into the receiving space such that a lead line of the connecting member covers the second terminal portion, and the cover portion covers at least a portion of the connecting member.

8. The connector of claim 6, wherein the protecting member protrudes beyond an outer surface of the first terminal portion.

9. The connector of claim 1, wherein the connector further comprises sidewalls extending from the bottom surface to form inner walls of the receiving space, such that the receiving space is a substantially rectangular space with an uncovered surface.

10. The connector of claim 9, wherein the cover portion is connected to the sidewalls with a hinge that allows the cover portion to open and close.

11. The connector of claim 10, wherein the sidewalls have a recessed portion and the cover portion has an extension extending from the hinge, wherein the cover portion is coupled to the sidewalls by placing the extension in the recessed portion.

12. The connector of claim 1, wherein the cover portion is a rectangular plate.

13. The connector of claim 12, wherein the protecting member covers substantially the entire length of the cover portion.

14. The connector of claim 12, wherein the protecting member is disposed on end portions of the length of the cover portion.

15. The connector of claim 1, wherein the terminal portion is arranged to electrically connect with a connecting member received by the receiving space.

16. The connector of claim 15, wherein the connecting member comprises a flexible printed circuit (FPC) film.

17. The connector of claim 16, wherein the connecting member is electrically connected to a terminal of a source printed circuit board (PCB) of a display device.

18. A connecting method using a connector, the method comprising:

forming a connector having a body portion with a receiving space, a terminal portion, a cover portion and a protecting member disposed on the cover portion; and inserting a connecting member into the receiving space to electrically connect the terminal portion of the connector to the connecting member, wherein the protecting member protrudes beyond an outer surface of the terminal portion and at least a portion of the terminal portion is uncovered by the cover portion,.

the protecting member extends along a longitudinal direction of the cover portion, and the protecting member is spaced apart from the uncovered portion of the terminal portion in a direction perpendicular to the longitudinal direction of the cover portion.

19. The method of claim 18, further comprising closing the cover portion to cover and secure the connecting member, wherein the closing entails rotating the cover portion around a hinge.

* * * * *